(12) United States Patent
Ramagiri et al.

(10) Patent No.: US 10,877,904 B2
(45) Date of Patent: Dec. 29, 2020

(54) SYSTEM, METHOD AND APPARATUS FOR ACCESSING SHARED MEMORY

(71) Applicant: Arm Limited, Cambridge (GB)

(72) Inventors: Gurunath Ramagiri, Austin, TX (US); Tushar P. Ringe, Austin, TX (US); Mukesh Patel, Round Rock, TX (US); Jamshed Jalal, Austin, TX (US); Ashok Kumar Tummala, Cedar Park, TX (US); Mark David Werkheiser, Austin, TX (US)

(73) Assignee: Arm Limited, Cambridge (GB)

( * ) Notice: Subject to any disclaimer, the term of this patent is extended or adjusted under 35 U.S.C. 154(b) by 35 days.

(21) Appl. No.: 16/361,728

(22) Filed: Mar. 22, 2019

(65) Prior Publication Data

US 2020/0301854 A1 Sep. 24, 2020

(51) Int. Cl.
*G06F 12/00* (2006.01)
*G06F 12/14* (2006.01)
*G06F 9/54* (2006.01)
*G06F 12/0817* (2016.01)

(52) U.S. Cl.
CPC ......... *G06F 12/1441* (2013.01); *G06F 9/544* (2013.01); *G06F 12/0828* (2013.01)

(58) Field of Classification Search
CPC ... G06F 12/1441; G06F 12/0828; G06F 9/544
See application file for complete search history.

(56) References Cited

U.S. PATENT DOCUMENTS

| 2014/0052905 | A1 | 2/2014 | Lih et al. | |
| 2018/0157590 | A1* | 6/2018 | Persson | G06F 12/0833 |
| 2019/0073324 | A1* | 3/2019 | Ringe | G06F 13/364 |

* cited by examiner

*Primary Examiner* — Kalpit Parikh
(74) *Attorney, Agent, or Firm* — Leveque IP Law, P.C.

(57) ABSTRACT

A system, apparatus and method for protecting coherent memory contents in a coherent data processing network by filtering data access requests and snoop response based on the Read/Write (R/W) access permissions. Requests are augmented with access permissions in memory protection units and the access permissions are used to control memory access by home nodes of the network.

20 Claims, 11 Drawing Sheets

SYSTEM, METHOD AND APPARATUS FOR ACCESSING SHARED MEMORY

BACKGROUND

The present disclosure relates generally to computer memory, and more particularly, to a scheme for accessing shared memory.

In many instruction execution systems, shared memory contents may be compromised by unauthorized access by a request to read or write data to the shared memory. These unauthorized accesses can undesirably corrupt the memory contents.

BRIEF DESCRIPTION OF THE DRAWINGS

The accompanying drawings provide visual representations, which will be used to more fully describe various representative embodiments and can be used by those skilled in the art to better understand the representative embodiments disclosed and their inherent advantages. In these drawings, like reference numerals identify corresponding elements.

DETAILED DESCRIPTION

Figure 1:
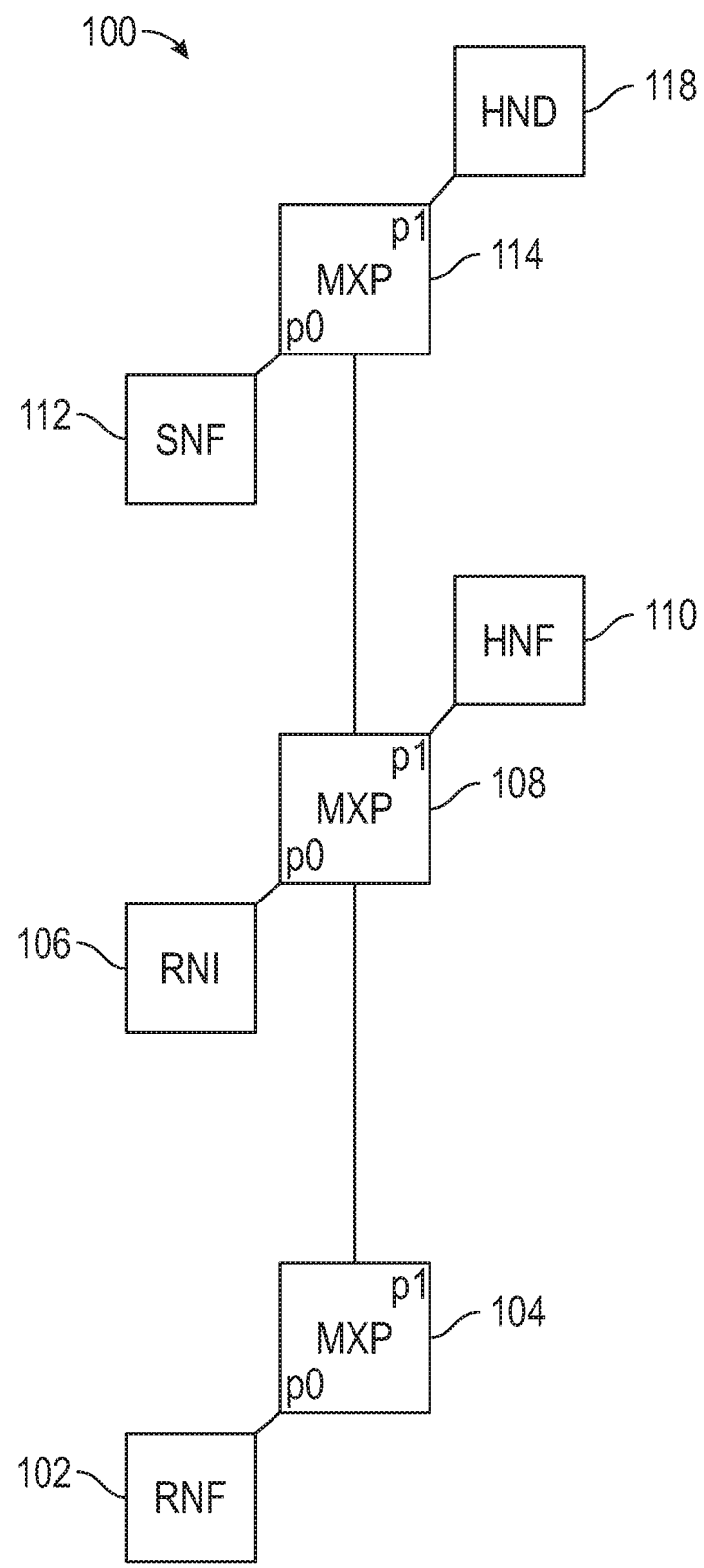
FIG. 1 illustrates an example 1×3 mesh CMN (coherent mesh network) system.

While this disclosure is susceptible of embodiment in many different forms, there is shown in the drawings and will herein be described in detail specific embodiments, with the understanding that the present disclosure is to be considered as an example of the principles described and not intended to limit the disclosure to the specific embodiments shown and described. In the description below, like reference numerals are used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms 'comprise', 'comprises,' 'comprising,' or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by 'comprises . . . a' does not, without more constraints, preclude the existence of additional identical elements in the process, method, article, or apparatus that comprises the element.

Reference throughout this document to 'one embodiment', 'certain embodiments', 'an embodiment' or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term 'or' as used herein is to be interpreted as an inclusive or meaning any one or any combination. Therefore, 'A, B or C' means 'any of the following: A; B; C; A and B; A and C; B and C; A, B and C'. An exception to this definition will occur only when a combination of elements, functions, steps or acts are in some way inherently mutually exclusive.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

Embodiments described herein show how shared memory contents can be protected from unauthorized accessors in a data processing network by using Read/Write permission per master per memory region.

In accordance with the present disclosure, there is provided an improved expedient for accessing shared memory while preventing unauthorized access.

FIG. 1 is a schematic of an example data processing network 100. In this simple example, the network is configured as a 1×3 mesh CMN (coherent mesh network). The cross points (MNP) provide points of intersection in the data processing network and are responsible for routing the protocol packets of a message to the correct node based on the target node identifier. One example of a CMN is the Arm® CoreLink™ CMN-600 Coherent Mesh Network, which is designed for intelligent connected systems across a wide range of applications including networking infrastructure, storage, server, HPC, automotive, and industrial solutions. The highly scalable mesh is optimized for Arm®v8-A processors and can be customized across a wide range of performance points. The data processing network may include a coherent interconnect such as, for example, the ARM® CMN family of products that are based on the ARM® AMBA®5 CHI protocol (ARM® and AMBA® are registered trademarks of Arm Limited). The interconnect specification identifies devices in an interconnect as described below.

The network may include one or more requesting nodes that operate as request masters and initiate data transactions. Example requesting nodes are:

RN-F: Fully-coherent requesting node, such as a central processing unit (CPU), coherent graphics processing unit (GPU), or other accelerator that operates as a request master.

RN-I: I/O coherent requesting node to tunnel input/output (I/O) traffic into a coherent hub interface (CHI) or other network interconnect, for example.

RN-D: distributed virtual memory (DVM) requesting node that supports DVM traffic.

The network may also include one or more home nodes that receive access requests from requesting nodes. Each home node serves as a point of coherence, and serialization, for a given set of memory addresses and may include a snoop filter for monitoring data transactions and maintaining a record of which data lines are stored at or owned by one or more nodes. When a memory access is received at a home node, a snoop request may be sent to nodes having copies of the accessed data in their local cache. Example home nodes include fully-coherent home nodes (HN-Fs) that service normal memory requests and I/O coherent home nodes (HN-Is) that are responsible for servicing I/O requests. Such nodes may contain cache memory and a snoop filter for efficient coherency resolution and hence send snoops when required. The cache memory is typically fast random access memory (RAM) that a processor can access more quickly than it can access regular RAM.

In addition the data processing network includes one or more slave nodes that service requests from home nodes if the requests cannot be serviced locally in home nodes. Examples of slave nodes are a memory controller or a requesting node. Otherwise, requests are serviced by the home node that receives the request.

As shown in FIG. 1, RNF (fully-coherent requesting node) 102 is operatively coupled to MXP (mesh cross-point) 104. MXP 104 is operatively coupled to MXP 108 and MXP 114. MXP 108 is operatively coupled to RNI (I/O coherent requesting node) 106 and FINE' (fully-coherent home node) 110. MXP 114 is operatively coupled to SNF (fully-coherent slave node) 112 and HND (home node) 118. Requesting nodes 102, 106 access data by sending a request to home nodes (HN-F/HN-I) 118, 110. Slave node 112 may be a dynamic memory controller (DMC), for example.

For read accesses, home node 118 looks up the incoming address in the cache memory and slave node 112. If the address is available in the cache memory, the request will be serviced by providing the data. If the data is not available in the cache but is hit in slave node 112, the home node 110 sends a snoop request to the RN-F 102 that contains the cache line and services the request. The snooped RN-F 102 can send the data back to home node 110 (so that the home node can service the request) or directly send the data to requesting node 106 in a process called DCT (Direct Cache Transfer) depending on the type of snoop request.

For write accesses from RN-F 102, home node 118 checks if the request is for a partial write or full cache line write. Depending on the size of the request, the home node 118 may merge the request data along with memory data or snooped data. The merged data is either written back to memory (slave node) or may be filled into the cache based on the request attribute and if the cache was present in the home node.

If the request incurred any error in the home node for example, a cache access error or a snoop error, the home node will complete the request by responding with the error status and may optionally raise an interrupt so that the master node knows the access status.

A coherent network protocol, such as the AMBA®5 CHI protocol, may specify various action requests:
1. Read requests with data—Responses will include data.
2. Read requests without data—Responses will not include data.
3. Write requests—Writing of clean/modified data from requestors to cache or memory.
4. Cache Maintenance Operations (CMOs)—Flushing of the cache lines to the memory such as DRAM, I/O master or downstream caches and other memory beyond home node.
5. Atomic requests—Performing sub-cache line atomic operations in memory.
6. Stash requests—Operations where the cache line will be stashed inside an RN-F cache for future access.

In a coherent network, various actions are performed to ensure that shared data is maintained in a coherent manner. For example, the actions may ensure that a node does not have an out-of-date copy of data. However, Read/Write accesses by unauthorized masters could lead to corrupting memory contents, and simple permission-based filtering does not address coherent systems where the unauthorized master could expose corrupt data in many different ways. Thus, in a protected memory system, some the desired actions—such as writing modified data back to a shared memory, may be not be permitted by a particular node. This has an impact on coherence maintenance.

The present disclosure is directed towards protecting memory in a coherent data processing network.

In one embodiment a request message from a first requesting node of the data processing network is received at a home node of the data processing network. The request message comprises an action request for data associated with a first address in a shared memory of the data processing network and one or more access permissions for the first requesting node for the first memory address. The request action may be for reading, writing or changing a coherence state of data associated with the first memory request, for example. The home node determines, from the one or more access permissions, if the requested action is permitted by the first requesting node. When the requested action is permitted by the first requesting node, data associated with the first memory address is accessed from a system cache, a local cache of a second requesting node of the data processing network or the shared memory in accordance with a coherency protocol. However, when the requested action is not permitted by the first requesting node, a response message is sent to the first requesting node without accessing the data associated with the first memory address.

Access permissions may be provided by using memory protection units (MPUs) located at cross-points of the data processing network. The MPUs have registers that are configurable to define access permissions for a request coupled to the network at the cross-point.

Figure 2:
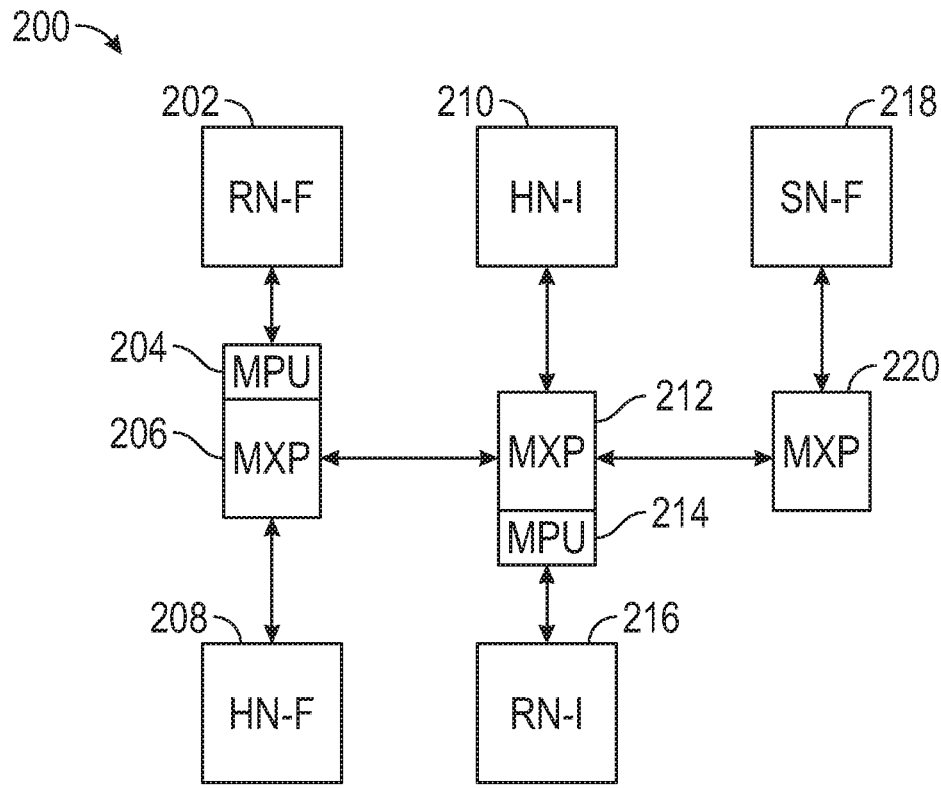
FIG. 2 is a block diagram of a data processing system with a memory protection unit (MPU) in accordance with various embodiments of the disclosure.

FIG. 2 illustrates system 200 with an example of a data processing network that incorporates memory protection units (MPUs). FIG. 2 shows master nodes RN-F 202, RN-I 216, mesh cross-points (MXP) 206, 212, 220, home nodes HN-I 210, HN-F 208, slave node SN-F 218 and MPUs 204, 214. The system 200 of FIG. 2 may be a coherent mesh network, for example.

Figure 3:
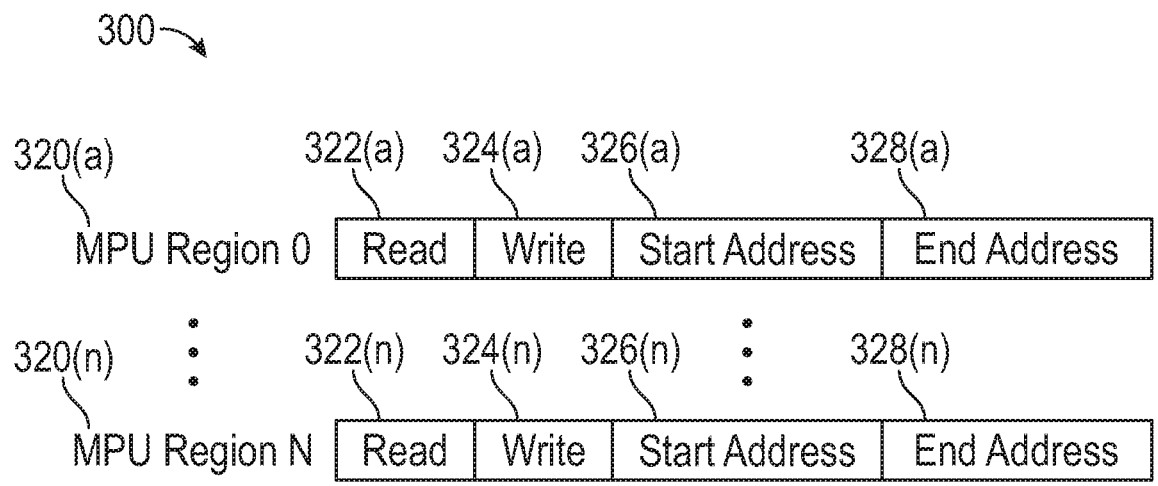
FIG. 3 illustrates an example of memory protection unit (MPU) address regions and permissions in accordance with various embodiments of the disclosure.

Each of the requesting node masters (RN-F 202 and RN-I 216) in system 200 is coupled to the network interconnect via a Memory Protection Unit (MPUs 204 and 214, respectively). The MPUs (204, 214) contain configurable registers which are programmed with address regions and the corresponding Read/Write permissions as shown in FIG. 3.

As stated above, the memory protection unit (MPh) 204, 214 may be a computer hardware unit. The MPU may be implemented as part of the central processing unit (CPU), as part of an interconnect fabric, or as a separate hardware module or block. In some embodiments, the MPU is a trimmed-down version of memory management unit (MMU) that provides only memory protection support and may be implemented in low power processors that require only memory protection rather than other memory management features such as virtual memory management.

First requesting node 202 is coupled to the home node 208 via a first memory protection unit 204 of the data processing system 200. First memory protection unit 204 receives an action request from the first requesting node 202, determines the one or more access permissions assigned to the first requesting node dependent upon the first memory address, and augments the action request with the one or more access permissions for the first requesting node before sending it to home node 208.

In an embodiment in accordance with the disclosure, the access permissions are stored in bits of the request that are unused in an existing architected interface, thereby enabling memory protection to be added to an existing messaging protocol. In another embodiment, an existing field (such as a transaction identifier field) in the request is extended to store the access permissions. In yet another embodiment, an additional field is added to the request to store the access permissions.

FIG. 3 illustrates an example 300 of memory protection unit (MPU) address regions and permissions. MPU region 0, 320(a), through MPU region N, 320(n) (where 'n' is any suitable number), each have a read area 322, write area 324, start address 326 and end address 328. The number of MPU regions is a design choice and any suitable number may be used. MPU region 0, 320(a), has associated read portion 322(a), write portion 324(a), start address 326(a) and end address 328(a). Similarly, MPU region N 320(n) has associated read portion 322(n), write portion 324(n), start address 326(n) and end address 328(n).

When a requesting node (e.g. 202 shown in FIG. 2) sends a request to a cross-point (e.g. 204 shown in FIG. 2), the address from the request is looked up in the MPU against regions represented by the start address 326 and end address 328. When a match is found, the corresponding Read and Write permission attributes for that region 320 are sent along with the request to the home node.

The MPU may also contain default Read/Write permissions if a region match is not found. The HN's then use the R/W permissions to allow access to memory contents.

These permission definitions include:
R: Request has Read Permission
W: Request has Write Permission
~Request does not have Read Permission
~Request does not have Write Permission A read request from a requesting node to a home node is intercepted by the MPU. The memory address to be read is looked-up in a table in the MPU to determine access permissions for the requesting node for the memory address. The MPU then augments the read request with the access permissions (APs) and forwards the augmented request to the home node. The flow is thus:
Requesting node→RN_Req→MPU Region lookup→RN_Req+APs→Home Node.

For snoop requests that a home node sends to a RN-F, the snoop address from the snoop request is looked up in the MPU. The snoop response is augmented with the access permissions and the augmented snoop response is sent back to the home node. The home node can then utilize the access permissions on the snoop response to make a decision. The flow is:
Home Node→HNF_Snp_request→MPU lookup→SnoopResponse+APs→Home Node.

The home node filters the snoop response based on the R/W access permissions.

Figure 4:
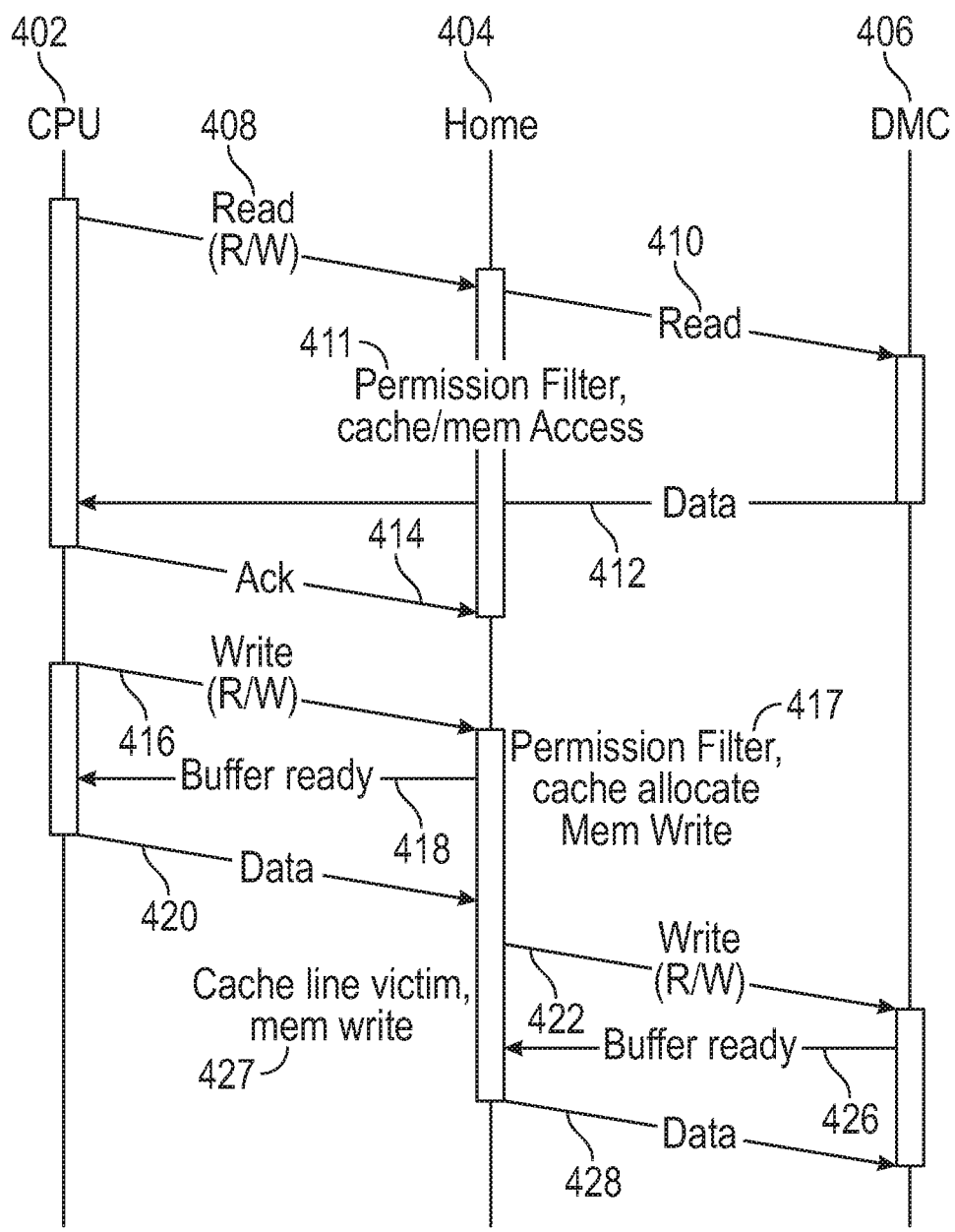
FIG. 4 is a signal flow chart of read and write transactions with permitted access in accordance with various embodiments of the disclosure.

FIG. 4 shows an example 400 of read/write request types with permitted access. A first requesting node, CPU 402, is in communication with home node 404 and slave node 406. In the example shown, slave node 406 is a dynamic memory controller (DMC).

A read request 408 is transmitted from CPU 402 to home node 404, which performs permission filtering, cache or memory access 411. In this example the CPU has read and write (R/W) access permission for the address and read request 408 is augmented with these permissions. The read request 410 is permitted and is transmitted to DMC 406. In response to message 410, data 412 is transmitted from DMC 406 to CPU 402.

An acknowledgement 414 is transmitted from CPU 402 to home node 404.

A write request 416 is sent from CPU 402 to home node 404. In response, home node 404 will perform permission filtering, cache allocation or a memory write 417. Before the memory write, a 'buffer ready' message 418 is sent from home node 404 to CPU 402 to indicate that the home node is ready to receive the data and has storage available for buffering the data. Data 420 is transmitted from CPU 402 to home node 404 and a write request 422 is transmitted from home node 404 to DMC 406. A 'buffer ready' message 426 is sent from DMC 406 to home node 404. Eventually, if this is a cache line victim, a memory write is performed 427 by the home node 404. Data 428 is transmitted from home node 404 to DMC 406.

Thus, in some embodiments, a home node responds to action requests in accordance with the augmented access permissions. In other words, the home node 'filters' the action request dependent upon the augmented access permissions. For example, when the action request comprises a read request and the one or more access permissions do not include read permission, the home node sends dummy data back to the first requesting node rather than servicing the request.

When the action request comprises a write request for modified data and the one or more access permissions do not include write permission, the home node discards the modified data and, optionally, invalidates the modified data at the first requesting node.

Figure 5:
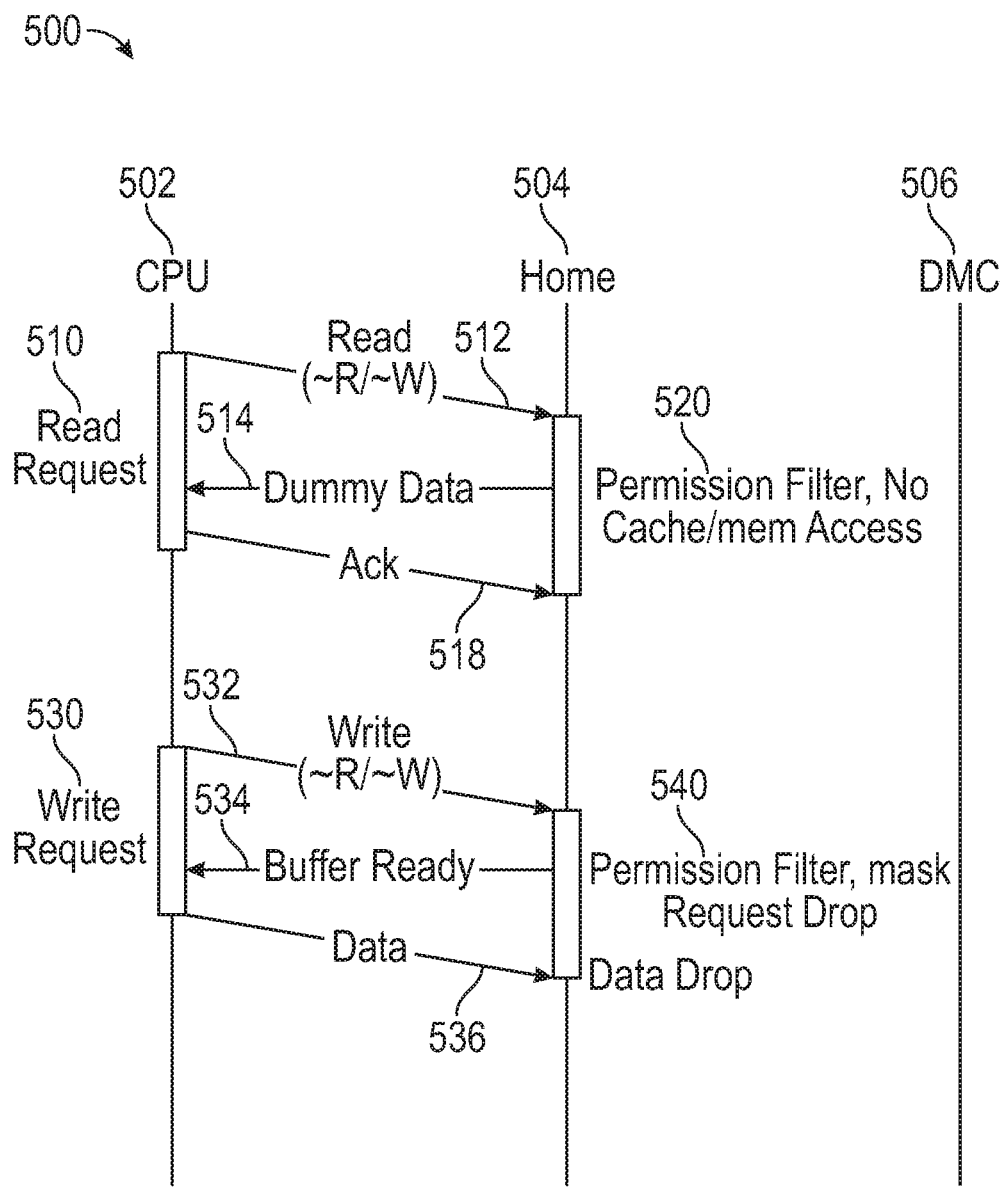
FIG. 5 is a signal flow chart of read and write transactions without permitted access in accordance with various embodiments of the disclosure.

FIG. 5 depicts an example 500 of request filtering based on access permissions in accordance with various embodiments of the disclosure. The series of actions are shown by arrows that denote information flows between a CPU, home node and DMC. FIG. 5 illustrates a CPU timeline 502, home node timeline 504 and DMC timeline 506, where time increases from top to bottom. The flow of information may be generated by the hardware of the data processing network, by software executed on a processor, or by a combination thereof.

The requestor protection mechanism as shown in FIG. 5 protects good data from being sent to the CPU 502. The first transaction is a read request 510 from the CPU. A read request 512 is transmitted from the CPU to the home node. Read request 512 is augmented with the access permissions (~R/~W). A permission filter of the home node determines from the access permissions that the read is not permitted so no cache or memory access is performed at 520. Instead, dummy data 514 is transmitted from the home node to the CPU and an acknowledgement 518 is transmitted from the CPU back to the home node.

A second transaction is a write request 530. A write request message 532, augmented with the access permissions (~R/~W), is sent from the CPU to the home node. In response, home node 504 determines from the access permissions that the CPU does not have write permission and the request is dropped at 540. Before the request is dropped, a 'buffer ready' message 534 is transmitted from the home node to the CPU and data 536 is transmitted from the CPU to the home node. Data 536 is dropped, however, since the requestor did not have write permission. Data 536 is not written to memory. Alternatively, the home node may send an error message to the CPU in the 'buffer ready' message 534.

The apparatus and system operation of FIG. 5 shows that the requestor protection mechanism provides request filtering based on access permissions. These permissions include read permission, write permission and snoop permission.

Read permission: If the RN did not have read permission on a read request, the home node (HN) will not lookup internal cache or snoop any RN-F's that may have the cache line. The HN will respond to the request with zero data and an error status indicating that the read request encountered an MPU violation.

Write permission: If the RN did not have write permission, the HN will process the request but any dirty data from the RN is not updated to memory. The HN may indicate permission error on any completion responses when required.

Figure 6:
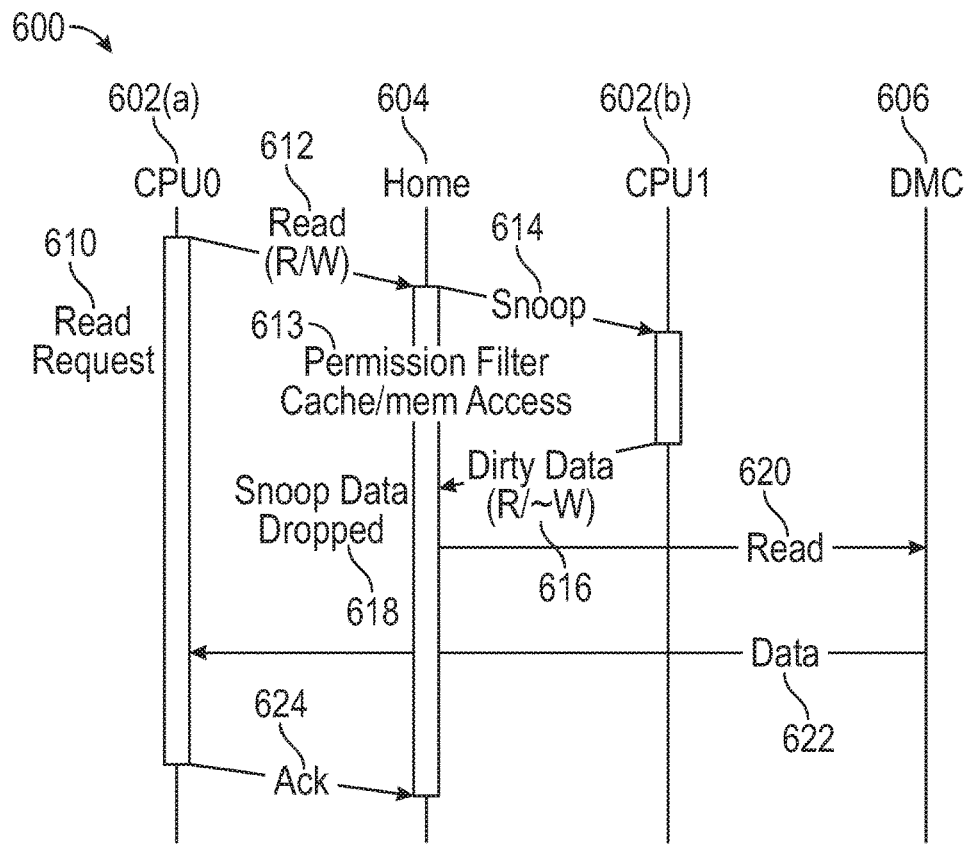
FIG. 6 is a signal flow chart of a snoop transaction in accordance with various embodiments of the disclosure.

Snoop permission: If an RN-F has to be snooped for coherency, the permissions on the snoop response are checked. If the snooped RN-F returns data, it will be filtered. A snoop response with dirty data will only be admitted of the RN-F had write permissions is shown in FIG. 6.

Figure 7:
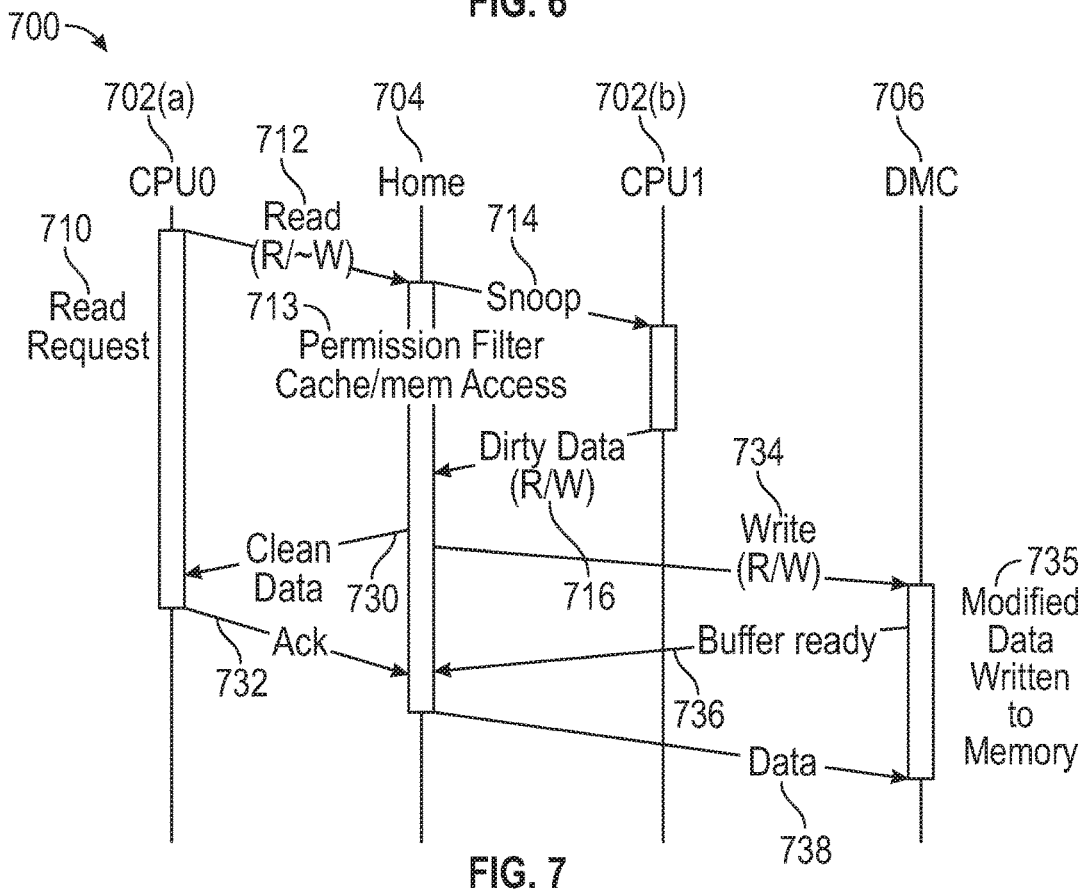
FIG. 7 is a signal flow chart of a further snoop transaction in accordance with various embodiments of the disclosure.

When the action request comprises a read request for data and a copy of the requested data is stored in a local cache of a second requesting node, the home node may retrieve data from the second requesting node by sending a snoop message to the second requesting node and receiving a data response. The data response is augmented by the access permissions of the second requesting node. When the retrieved data is in a modified state, the home node proceeds depending upon the access permissions, as illustrated in FIGS. 6 and 7 discussed below.

When the second requesting node has write permission for the modified data and the first requesting node does not have write permission for the modified data, the home node writes the modified data to the shared memory at the first memory address to change the modified data to clean data and sends the clean data to the first requesting node.

When the second requesting node has write permission for the modified data when the first requesting node has write permission for the modified data, the home node sends the modified data to the first requesting node.

When the second requesting node does not have write permission for the modified data, the home node retrieves clean data from the shared memory at the first memory address, sends the clean data to the first requesting node, and invalidates the data associated with the first memory address at the second requesting node.

FIG. 6 is a signal flow chart 600 of snooped central processing unit (CPU) filtering based on access permission. Snoop response with dirty data will only be admitted if the RN-F had Write permissions. Similarly, the clean data is only admitted if the RN-F had Read permission. If there was an MPU violation, the data is dropped. The home node will fetch data from DMC and service the request. As shown in FIG. 6, the signal flow chart 600 for a read request transaction 610 is initiated by a first requesting node, CPU0. FIG. 6 further shows CPU0 timeline 602(a), home node timeline 604, a second requesting node (CPU1) timeline 602(b) and DMC timeline 606. A read request with read and write permission (R/W) 612 is transmitted from the first requesting node (CPU0) to the home node. The permission filter of the home node permits cache and/or memory access 613 since CPU0 has read permission. A snoop request 614 is transmitted from home node to the second requesting node (CPU1), which has been determined to have a copy of the requested data. CPU1 responds by returning modified or 'dirty' snoop data 616 to the home node. The snoop data is augmented by the (R/~W) access permissions of CPU1. Since CPU1 does not have write permission, the snoop data is dropped at 618 by the home node and a read request 620 is sent from the home node to the DMC to retrieve clean data. Clean data 622 is then transmitted from the DMC to CPU0 and an acknowledgement 624 is sent from CPU0 to the home node.

FIG. 7 illustrates another embodiment 700 in which the first requesting node (CPU0) has read permission but does not have write permission (R/~W). This expedient is an example of controlling 'clean' data versus 'dirty' (modified) data based on access permission, and shows CPU0 timeline 702(a), home node timeline 704, a second requesting node (CPU1) timeline 702(b) and DMC timeline 706. The home node in such cases writes the modified data to the DMC and provides clean data to the first requesting node. If the modified data was provided without DMC write, any subsequent evictions from the CPU would have been dropped (due to write permission filtering) thereby losing the modified data.

FIG. 7 further shows a read request transaction 710 initiated by first requesting node, CPU0. Read request 712, which has read permission but not write permission (R/~W), is transmitted to home node. Since CPU0 has read permission, the permission filter of the home node permits cache and/or memory access 713. A snoop request 714 is transmitted from the home node to second requesting node (CPU1). CPU1 transmits modified dirty data 716, augmented with (R/W) permission, to home node 704. Since the write is permitted, the home node sends write request 734 (with R/W permissions) to the DMC to initiate writing the modified data to memory 735. 'Buffer ready' 736 signal is transmitted from DMC to home node and data 738 is then transmitted from home node to DMC to complete that write-back to memory and change the coherence state of the data from modified (dirty) to clean. The clean data 730 is transmitted from the home node to CPU0 and an acknowledgment 732 is transmitted from CPU0 to the home node.

When the action request comprises a request to invalidate data at the first address for which the first requesting node does not have write permission, and when a copy of the data is stored at a second requesting node, the home node retrieves the data associated with the first memory address from the second requesting node. When the retrieved data is in a modified coherence state, the home node writes the retrieved data to the shared memory at the first memory address to change the coherence state of the data associated with the first memory address from 'modified' to 'clean' and invalidates the data associated with the first memory address at the second requesting node.

Figure 8:
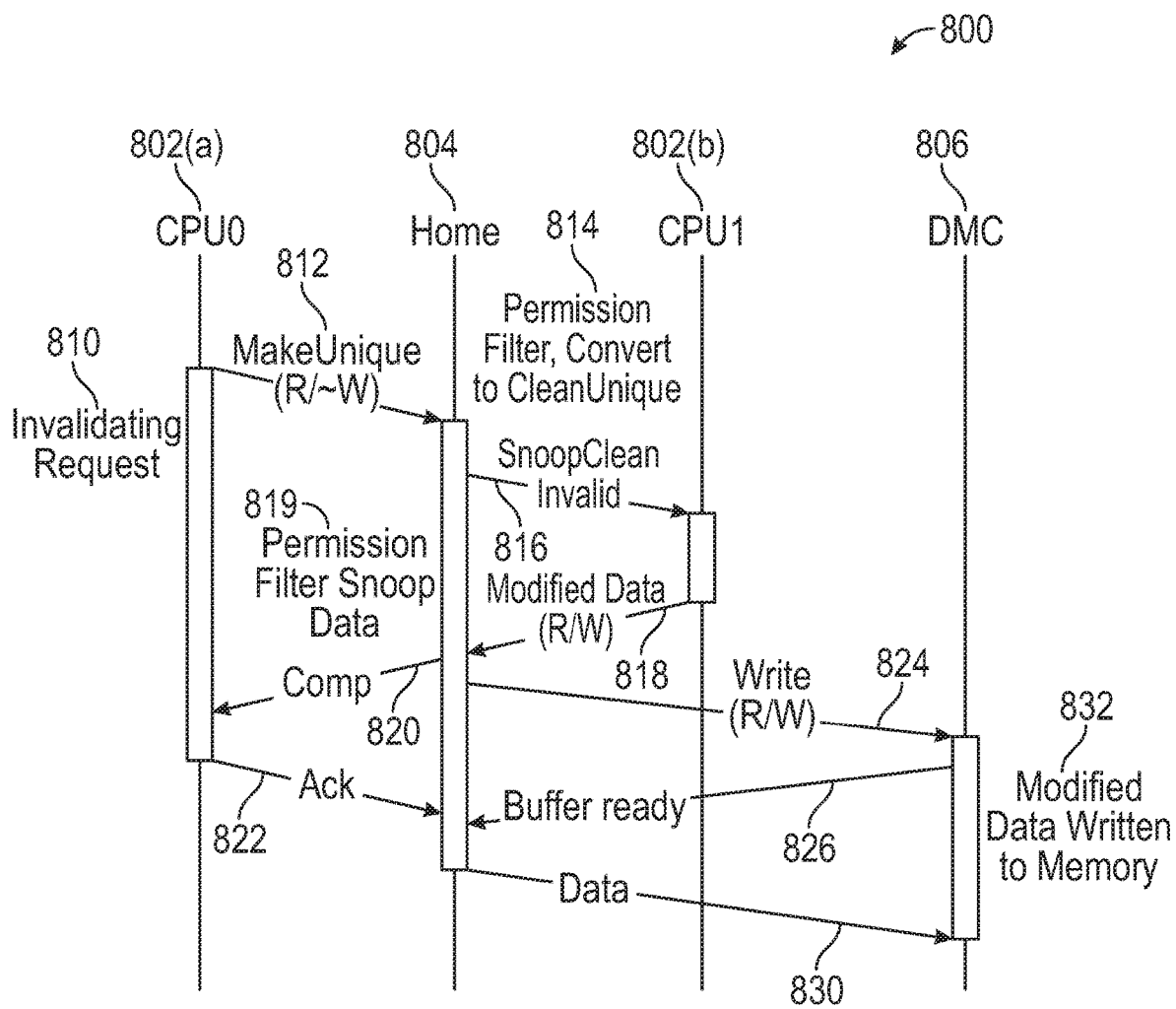
FIGS. 8-10 are signal flow charts of further access transactions in accordance with various embodiments of the disclosure.

FIG. 8 is a signal flow chart 800 of a method for invalidating request permission filtering. FIG. 8 shows CPU0 timeline 802(*a*), home node timeline 804, a second requesting node (CPU1) timeline 802(*b*) and DMC timeline 806. The invalidating transaction 810 is initiated by CPU0. A request to invalidate data stored at other nodes may be designated as a request to make the data unique. A 'make unique' request 812, augmented with (R/~W) access permissions is transmitted to the home node. The permission filter at the home node converts the request to a 'clean-unique' request at 814. A 'snoop-clean-invalid' request 816 is transmitted from the home node to CPU1. CPU1 transmits modified data 818, augmented with (R/W) permissions, to the home node to provide snoop data 818. Completion of the invalidation is sent in message 820 from the home node to CPU0 and an acknowledgment 822 is transmitted from CPU0 to the home node.

In order to prevent the modified data from being lost, the home node sends write request 824, with (R/W) permissions, to the DMC. 'Buffer ready' 826 signal is transmitted from DMC to the home node and data 830 is then transmitted from the home node to DMC. Thus, the data is written back to the memory at 832.

In an instance of invalidating request permission, requests that are invalidating types and have Read-only permission (e.g., ReadOnceMakeInvalid, MakeUnique, etc.) where the RN (requesting node) may receive the data or completion without data while invalidating memory contents from all downstream or peer cache, the home node will convert such requests to non-invasive type requests as shown in FIG. 8. For example, MakeUnique request 812 is converted to CleanUnique request 814 and ReadOnceMakeInvalid (not labeled) is converted to ReadOnceCleanInvalid (not labeled). Such conversion ensures that existing dirty or modified data in the system is written to memory and completion does not corrupt any memory contents.

For CMOs, the home node will do similar conversion to a non-invasive type request if the requesting node had Read-Only permission. For example, MakeInvalid is converted to CleanInvalid. If the requesting node had no read or write permission, then the transaction is completed without updating the memory.

Another sequence is data-less request permission in which certain request types such as MakeUnique and CleanUnique have completions without data. If the CPU does not require a permission error notification (bus error), it can falsely transition to 'clean' status. Thus, clean data is data that is suitable for storing in coherent memory. This data is different than dirty data since it is valid, or clear, or acceptable. Subsequent snoops to this cache line could expose the bad data to other CPUs and memory locations. To avoid this, the home node follows the data-less request completion with Invalidating snoop requests (SnpMakeInvalid) to invalidate the cache line in the RN cache. This ensures that the CPU does not have the cache line in unique state.

Figure 9:
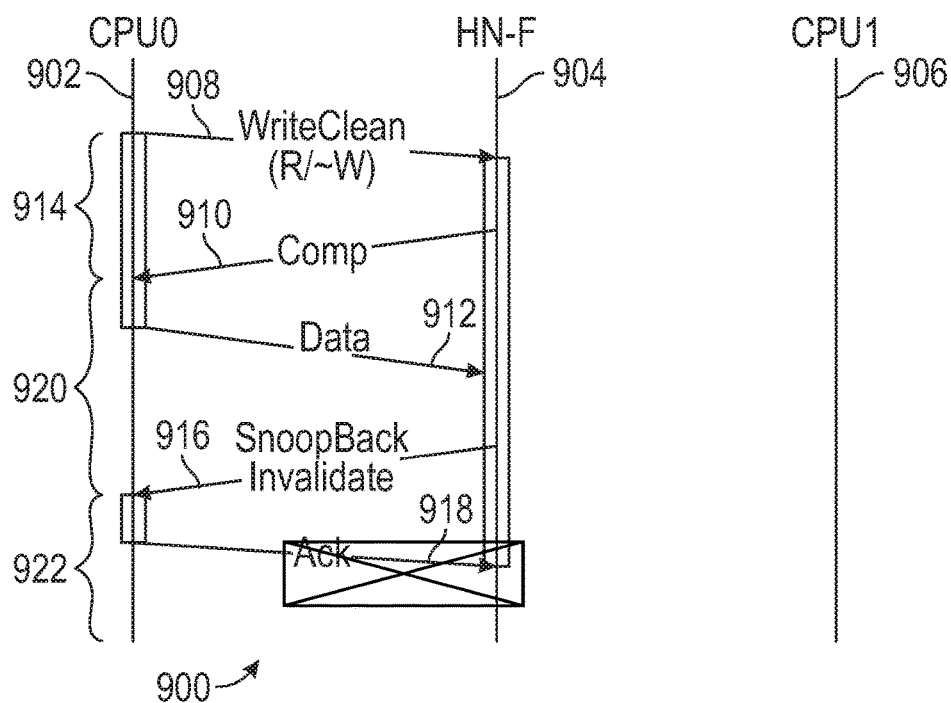

FIG. 9 is a signal flow diagram 900 of a method for permission filtering of a write request, in accordance with various embodiments. In this connection, there is shown timeline 902 for a first request node (CPU0), timeline 904 for a home node (HN-F), timeline 906 for a second requesting node (CPU1). Access request 908 is a 'WriteClean' request to write back modified (dirty) data to the memory to change the status of the data from dirty to clean. However, access permissions augmented to the request indicate that CPU0 does not have write permission for the data address. On receipt of the request, the home node HN-F determines that CPU0 does not have write permission. The home node does not snoop CPU1 and does not write the data back to memory. The home node sends a completion message 910 back to CPU0, which indicates that the home node is ready to receive data. The CPU0 sends the data to the home node in message 912. Thus, for time period 914, CPU0 has 'bad' data that is modified (dirty) but cannot be written back to memory. Once the data is written back to the home node in message 912, CPU0 changes the status of the data to 'clean'. However, the data is still 'bad'. The home node then sends invalidation message 916 to CPU0 to invalidate the data stored at CPU0. CPU0 acknowledges this in message 918. Thus, for time period 920, CPU0 shows the status of the data as 'clean', but in time period 922 the data is shown as invalid.

Figure 10:
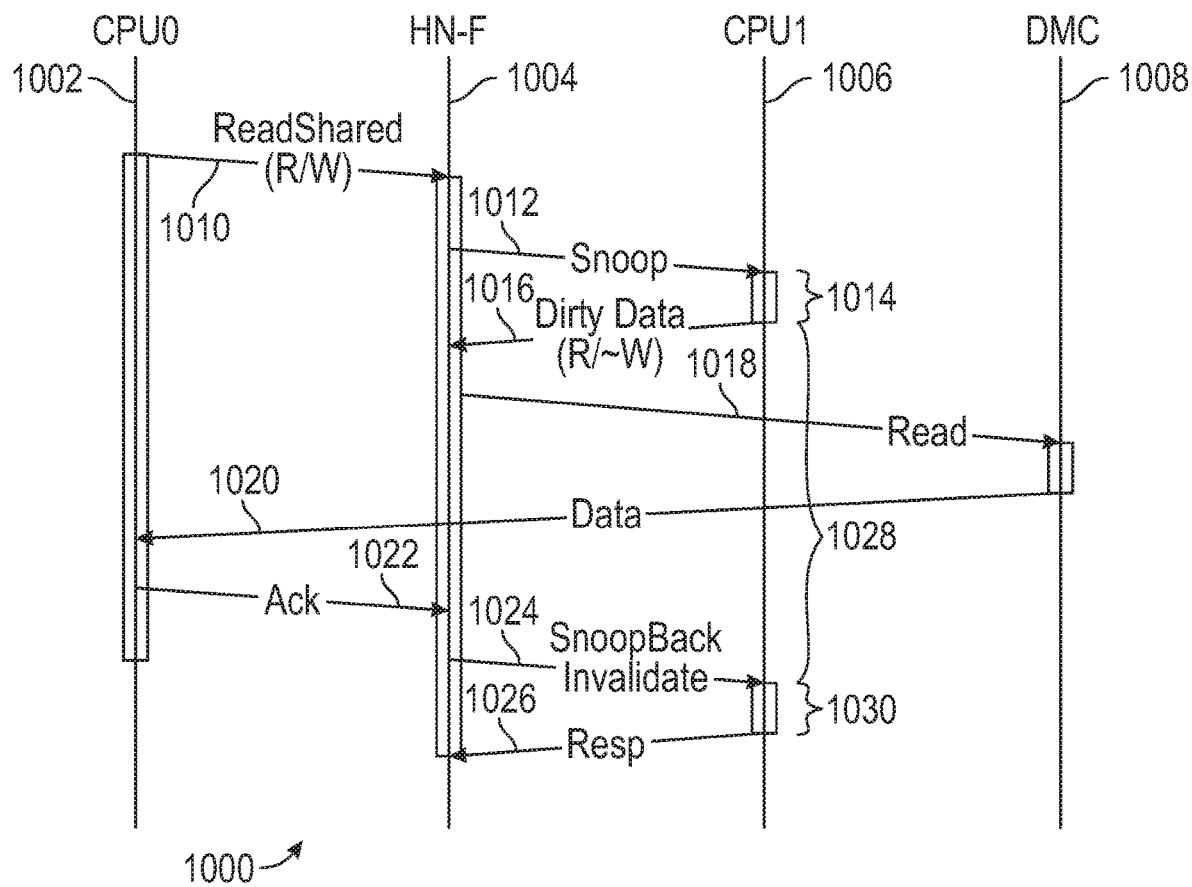

FIG. 10 is a signal flow diagram of a method for permission filtering of a read request in accordance with various embodiments of the disclosure. The flow diagram includes a timeline 1002 for a first request node (CPU0), timeline 1004 for a home node (HN-F), timeline 1006 for a second requesting node (CPU1), and timeline 1008 for a memory controller (DMC). Access request 1010 from the first requesting node (CPU0) is a 'ReadShared' request to obtain a copy of data stored at the second requesting node (CPU1). Since CPU0 has read permission for memory address, the home node sends snoop message 1012 to CPU1 for the data. The data at CPU1 in time period 1014 is 'bad' in the sense that it is modified but cannot be cleaned by writing back to memory since CPU1 does not have write permission for the data. However, CPU1 returns the modified (dirty) data to the home node in snoop response 1016. The access permissions in snoop response 1016 indicate to the home node that CPU1 does not have write permission and that the data is 'bad'. The home node sends read request 1018 to the memory controller (DMC) for clean data. The clean data is sent in message 1020 back the first requesting node (CPU0) and the data is acknowledged to the home node in message 1022. CPU0 now has good data, but CPU1 still has bad data. Accordingly, the home node sends invalidating message 1024 to CPU1, which CPU1 acknowledges in response 1026. In this manner, 'bad' data at CPU1 is not passed to CPU0, from where it could be written back to memory, and the memory is protected.

Figure 11A:
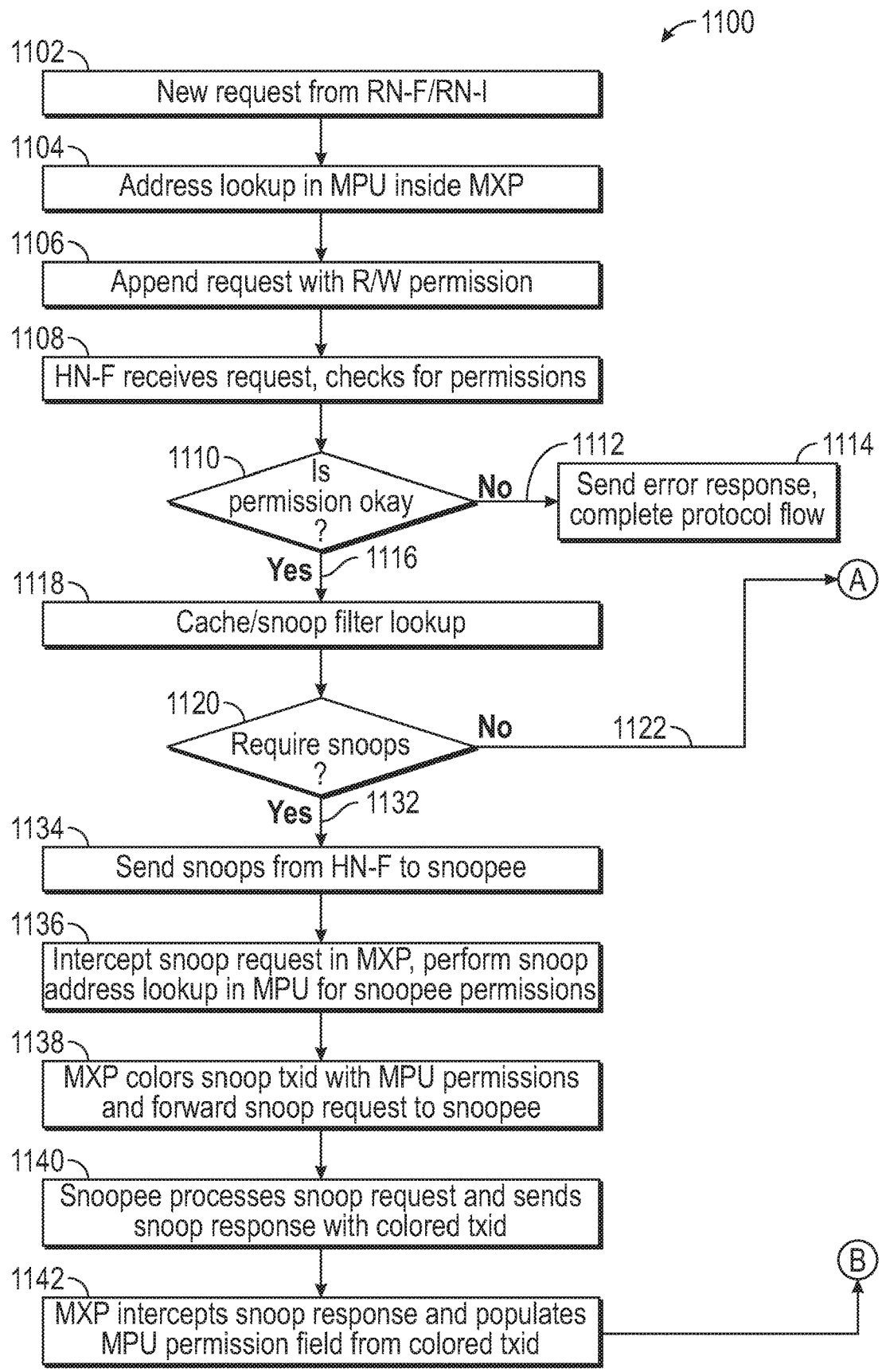
FIGS. 11A and 11B are a flow chart illustrating request filtering dependent upon access permissions in accordance with various embodiments of the disclosure.
Figure 11B:
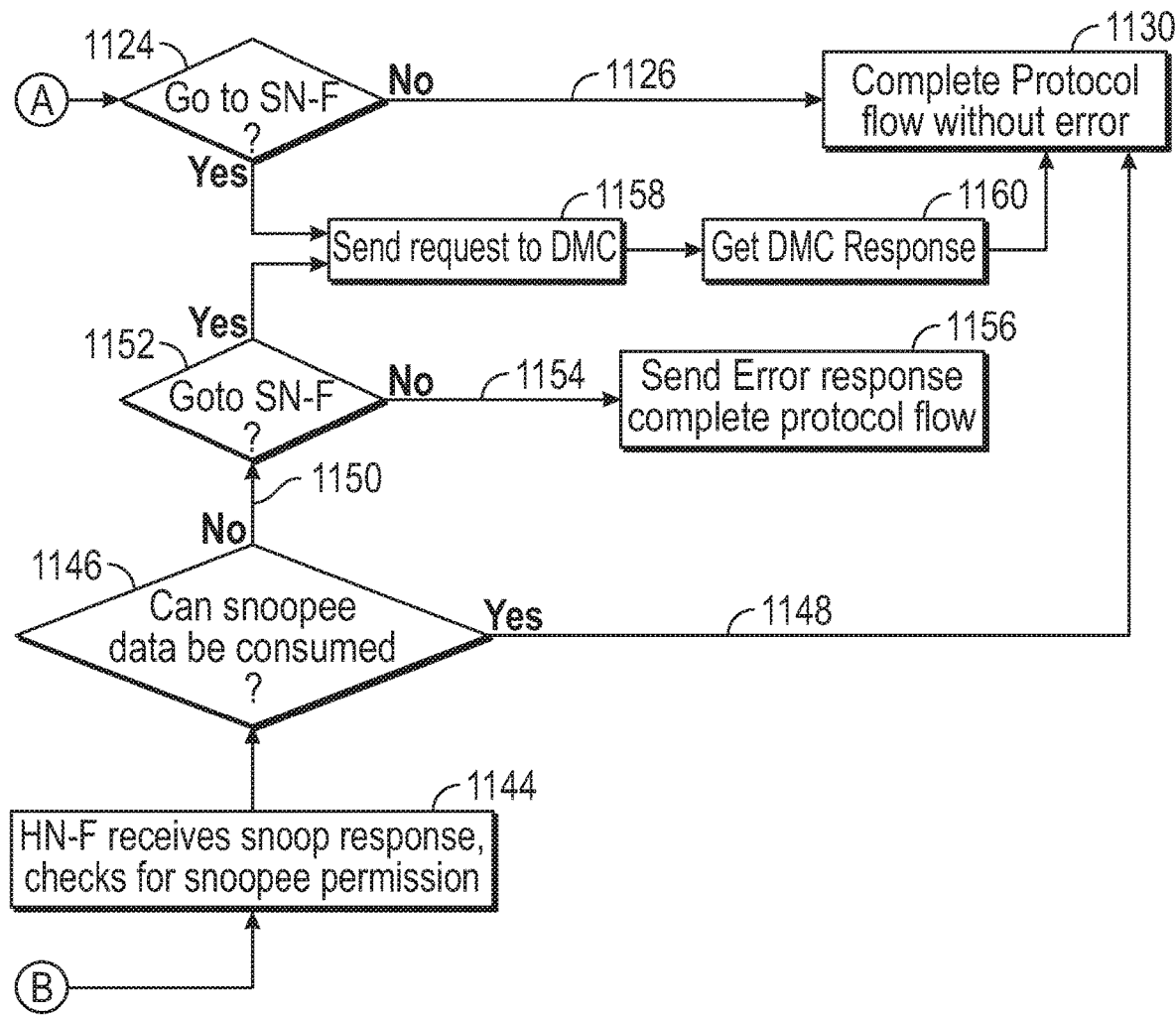

FIGS. 11A and 11B are a flow chart 1100 of a method for filtering access permissions in accordance with embodiments of the disclosure. The method may be implemented in the hardware of a data processing network.

Referring to FIG. 11A, a new request from a first requesting node (RN-F or RN-I) is accessed at block 1102 and address look-up in MPU inside MXP is performed at block 1104. The request is appended with R/W (read/write) permission at block 1106.

The home node (HN-F) receives the request and checks for permissions at block 1108. A determination is made whether the permissions are acceptable at decision block 1110. If the permissions are not acceptable, as depicted by the negative branch 1112 from decision block 1110, an error response is sent at block 1114 and the protocol flow is completed.

When the permissions are deemed acceptable, as depicted by the positive branch 1116 from decision block 1110, a cache/snoop filter look-up is performed at block 1118. A determination is then made at decision block 1120 as to whether snoops are required. If not, as depicted by the negative branch 1122 from decision block 1120, flow continues to point 'A' and from there to decision block 1124 in FIG. 11B.

Referring now to FIG. 11B, if a snoop to a slave node SN-F is not required, as depicted by the negative branch 1126 from decision block 1124, the protocol flow is complete without error at block 1130.

If it is determined to go to SN-F, as depicted by the positive branch from decision block 1124, the request is sent to DMC at block 1158 and a response is received from the DMC at block 1160. As stated above, the protocol flow is complete without error at block 1030.

Referring again to FIG. 11A, when a snoop is required as depicted by the positive branch 1132 from decision block 1120, a snoop is sent at block 1134 from the home node to a node (referred to as the 'snoopee') that is indicated in the snoop filter as having a copy of the data. The MXP intercepts the snoop request and performs snoop address look-up in MPU for snoopee permissions at block 1136. The MXP colors the snoop transaction identifier with MPU permissions and forwards the snoop request to snoopee at block 1138. The snoopee then processes the snoop request and sends a snoop response with colored transaction identifier at block 1140.

The MXP intercepts the snoop response and populates the MPU permission field from the colored transaction identifier at block 1142 and flow continues to point 'B'.

Referring again to FIG. 11B, the home node (HN-F) receives the snoop response and checks for snoopee permissions at block 1144. A determination is made at decision block 1146 as to whether the snoopee data can be used or consumed. If so, as depicted by the positive branch 1148 from decision block 1146, the protocol flow is complete without error at block 1130.

If the snoopee data cannot be consumed, as depicted by the negative branch 1150 from decision block 1146, determination is made at decision block 1152 as to whether the request goes to the SN-F. If so, as depicted by the positive branch from decision block 1152, the request is sent to DMC at block 1158, a DMC response is received at block 1160 and the protocol flow is complete without error at block 1130.

If the determination is made that the request does not go to SN-F, as depicted by the negative branch 1154 from decision block 1152, an error response is sent and the protocol flow is completed at block 1156.

The snoop request received at the snoopee or second requesting node contains the memory address of the snooped data. This memory address can used in the MPU to determine access permissions. The snoop response does not, in general, include a memory address that may include a transaction identifier. In one embodiment, the access permissions are associated with a transaction identifier in MPU when a snoop request is received in order to augment the snoop response with access permissions. This may be done, for example, by storing a table in the MPU. The same transaction identifier in the snoop response is then used to identify the access permissions when a snoop response is received from the snoopee. In another embodiment, the access permissions are added to the transaction identifier message sent to the snoopee. Thus, the access permissions are stored in the request to the snoopee and returned in the response from the snoopee. For example, the number of transaction identifiers may be reduced by a factor of four and the access permissions stored in the two most significant bits of the transaction identifier. The transaction identifier is then said to be 'colored' by the access permissions. In this embodiment the memory protection unit intercepts the snoop message to the second requesting node, colors a transaction identifier in the snoop message with the one or more access permissions of the second requesting node to provide a colored snoop message and forwards the colored snoop message to the second requesting node. The memory protection unit then intercepts the snoop response from the second requesting node de-colors the transaction identifier in the snoop response and forwards the decolored snoop response, augmented with the one or more access permissions, to the home node.

In either embodiment, the home node sends a snoop message to the second requesting node or snoopee via the MPU and the second requesting node sends a snoop response comprising snooped data. The second memory protection unit augments the snoop response with one or more access permissions for the second requesting node. This is done by using the transaction identifier to lookup the access permissions or by reading the access permissions from the colored transaction identifier, for example. The home node receives the augmented snoop response and drops the snooped data when the one or more access permissions for the second requesting node indicate that the second requesting node does not have read permission for the snooped data. The home node also drops the snooped data when the snooped data is modified and one or more access permissions for the second requesting node indicate that the second requesting node does not have write permission for the modified data. In addition, the snooped data at the second requesting node may be invalidated when the snooped data is dropped by the home node when the coherency protocol allows the second requesting node to retain a copy of the first data.

When the snooped data is dropped by the home node, the home node retrieves clean data from the shared memory at the first memory address and sends it to the first requesting node.

Figure 12:
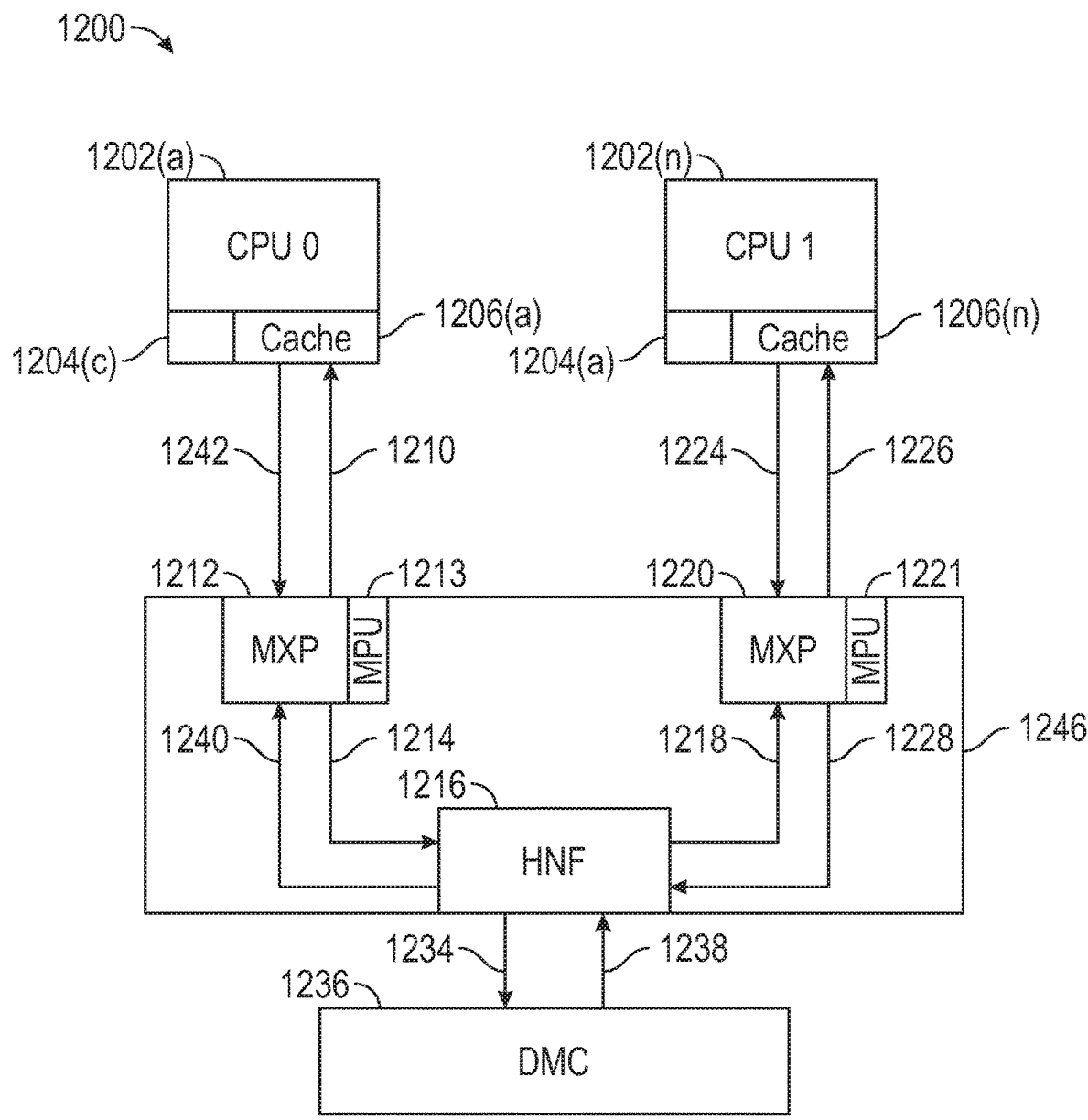
FIG. 12 illustrates an apparatus for filtering requests in accordance with various embodiments of the disclosure.

FIG. 12 shows an apparatus 1200 for filtering requests in accordance with an embodiment of the disclosure. The apparatus is used to determine whether to grant access to shared memory based on a permission access request or to deny a permission access request. The apparatus 1200 includes CPU0 1202(*a*), CPU0 1202(*n*), module 1204(*a*), module 1204(*n*), cache 1206(*a*), cache 1206(*n*), node module 1246 and DMC 1236. $CPU_0$ 1202(*a*) can be deemed a first processor or first CPU master, or CPU/IO. CPU1 1202(*n*) can be deemed a second processor or second CPU master.

Coherent interconnect 1246 includes crosspoints (MXPs) 1212 and 1220, and home node HN-F 1216. The MXPs 1212 and 1220 each contain a memory protection unit (MPU) (1213 and 1221 respectively).

CPU0 1202(*a*) and CPU1 1202(*n*) are in bi-directional communication with coherent interconnect 1246 via links 1210, 1242 and 1224, 1226, respectively. Coherent interconnect 1246 is in bi-directional communication with DMC (memory controller) 1236 via links 1234, 1238. The bi-directional communication may be a data communication bus, wire, set of wires, wireless channel or other suitable transmission medium that permits data to be transferred (transmitted and/or received) between the constituent components of apparatus 1200.

In operation, cache 1206(*a*) of CPU0 1202(*a*) sends a data access request to MXP 1212 of interconnect 1246, as shown by line 1242. The MPU at the cross-point 1212 augments the request with access permissions.

MPU at cross-point 1212 sends the request to home node (HN-F) 1216 via line 1214. HN-F 1216 sends a snoop request to CPU1 (1202(*n*)) via MXP 1220 on link 1218. The MPU at 1220 colors the transaction identifier in the snoop request with the access permissions and forwards the snoop request to cache 1206(*n*) of CPU1 1202(*n*) via line 1224.

Following the reception at cache 1206(*n*), a data response is sent from cache 1206(*n*) to the MPU at cross-point 1220 via line 1226. The transaction identifier in the data response is decolored by the MPU and forwarded to HN-F 1216 via line 1228. The HN-F module 1216 transmits the data to DMC 1236 via line 1234.

HN-F module 1216 sends the data to MXP 1212 via line 1240. MXP 1212 forwards the data to cache 1206(*a*) of CPU0 1202(*a*) via line 1210.

Thus, in various embodiments, an apparatus is provided comprising a plurality of cross-point switches, a home node and an interconnect. A cross-point switch comprises a first memory protection unit and provides an interface to a first requesting node, while the interconnect couples between the plurality of cross-point switches, the home node and a shared memory. The home node provides a point of coherency for access to the shared memory. The memory protection unit intercepts a message directed from the first requesting node to the home node, augments the intercepted message with one or more access permission of the first requesting node, and forwards the augmented message to the home node. The home node responds to the augmented message dependent upon the one or more access permissions.

A message received at a memory protection unit is associated with a first memory address in the shared memory and the memory protection unit is configured to look up the one or more access permissions in an address table of the first memory protection unit dependent upon the first memory address.

A memory protection unit at a second requesting node receives snoop messages from a home node, since the home node is configured to send snoop messages in response to access request from a first requesting node. The second requesting node sends a snoop response, containing snooped data, back to the home node responsive to the snoop message. The memory protection unit at the second requesting node intercepts the snoop response, augments the snoop response with one or more access permissions of the second requesting node and forwards the augmented snoop response to the home node. The home node is further configured to drop the snooped data when the one or more access permissions for the second requesting node indicate that the second requesting node does not have read permission for the snooped data and to drop the snooped data when the snooped data is modified and the one or more access permissions for the second requesting node indicate that the second requesting node does not have write permission for the modified data.

In addition, the home node retrieves clean data from the shared memory when the snooped data is dropped and forwards the clean data to the first requesting node.

When the message from the first requesting node comprises a read request for data associated with a first memory address in the shared memory and the one or more access permissions indicate that the first requesting node does not have read permission for the first memory address, the home node sends dummy data to the first requesting node. The home node may invalidate first data at the first requesting node when the message from the first requesting node comprises a write request for the first data and the one or more access permissions indicate that the first requesting node does not have write permission for the first memory address and the write request is of a type that allows the first requesting node to retain a copy of the first data. The home node may drop the write request when the one or more access permissions indicate that the first requesting node does not have write permission for the first memory address.

Access permissions in the snoop response may be obtained by coloring a transaction identifier received in a snoop request.

FIGS. 13A-D show MPU coloring of a transaction identifier. A common transaction identifier is included in all messages that are part of the same transaction, such as messages passed along request links 1242, 1214, 1218, and 1236, and response links 1234, 1238, 1240 and 1210 illustrated in FIG. 12, and enable responses to be associated with requests. In accordance with an embodiment, the transaction identifier may be restricted so that bits of the identifier may be used for access permissions.

Figure 13A:
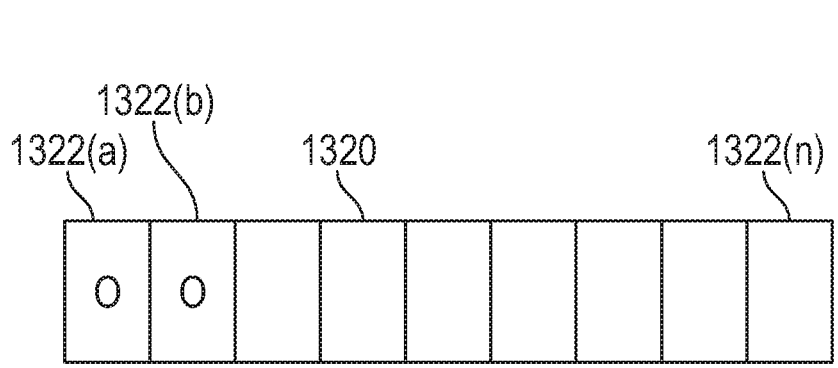
FIGS. 13A-D depict coloring of a transaction identifier by a memory protection unit in accordance with various embodiments of the disclosure.

FIG. 13A shows a register 1320, with bits 1322(*a*) . . . (*n*) (where 'n' is any suitable number), for holding a transaction identifier. In this example, the register 1320 has two bits 1322(*a*) and 1322(*b*) that are not used for the restricted transaction identifier. These may be filled with zeros, for example. This register status 1320 corresponding to a snoop request described in FIG. 12 as snoop request 1218 is transmitted from HN-F 1216 to MXP 1230.

Figure 13B:
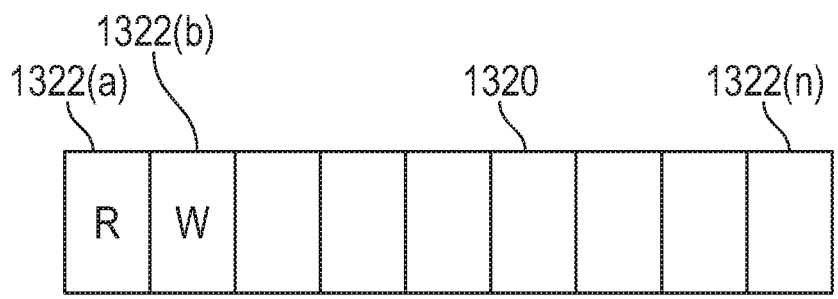

FIG. 13B depicts a register 1320 with bits 1322(*a*) . . . (*n*) (where 'n' is any suitable number). Register 1320 has two bits 1322(*a*) and 1322(*b*) filled with R and W, respectively. This register status 1320 corresponds to the snoop request described in FIG. 12 as snoop request 1234 is transmitted from MXP 1230 to cache 1206(*n*) of CPU1 1202(*n*). The MPU in the MXP uses the address in the snoop request to retrieve the access permissions and populates the two unused bits, 1322(*a*) and 1322(*b*), in the transaction identifier field with the access permissions. The transaction identifier is said to be 'colored' by the access permissions.

Figure 13C:
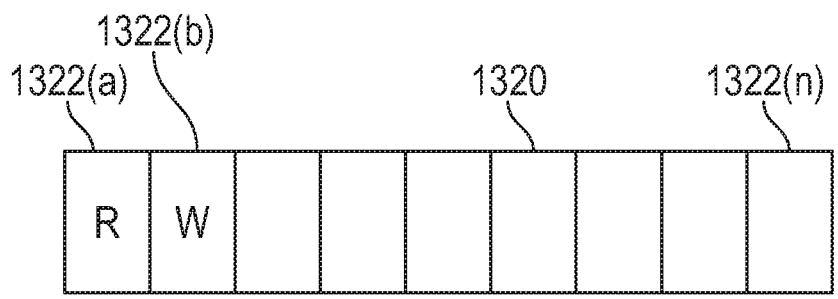

FIG. 13C illustrates a register 1320 with bits 1322(*a*) . . . (*n*) (where 'n' is any suitable number). Register 1320 has two bits 1322(*a*) and 1322(*b*) filled with R and W, respectively. This register status 1320 corresponds to a transaction identifier transmitted from CPU1 1202(*n*) to MXP 1230 via link 1236 in FIG. 12. No changes are to the operation of CPU1 are required, since CPU returns the same transaction identifier (colored with the access permissions) as it receives.

Figure 13D:
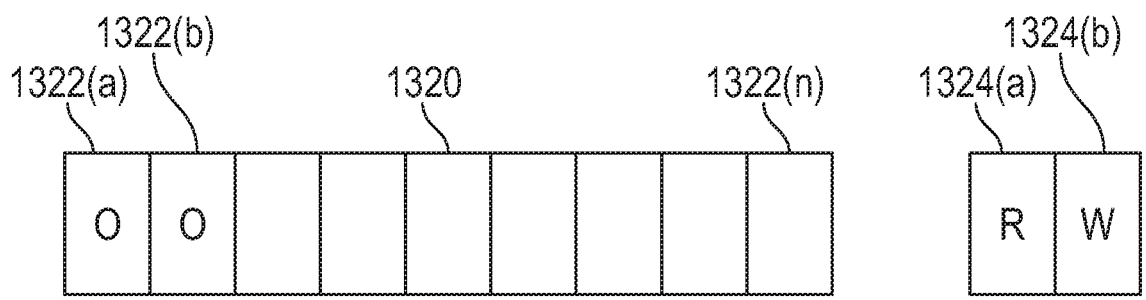

FIG. 13D shows a register 1320 with bits 1322(*a*) . . . (*n*) (where 'n' is any suitable number). Register 1320 has two bits 1322(*a*) and 1322(*b*) filled with zeros. Bits 1324(*a*) and 1324(*b*) are filled with R and W, respectively. This register 1320 corresponds to a snoop response going to the home node. It shows that the R and W bits are not in the transaction identifier 1320. The access permissions, shown as bits 1324(*a*) and (*b*), are remove from the transaction identifier and replaced by zeros in the snoop response transmitted from MXP 1230 to HN-F 1216 via link 1238 in FIG. 12. The snoop response to the home node is augmented with the access permissions.

As used herein the term 'processor' may encompass or make use of programmable hardware such as: computers, microcontrollers, embedded microcontrollers, microprocessors, application-specific integrated circuits (ASICs), field-programmable gate arrays (FPGAs), and complex programmable logic devices (CPLDs). These hardware examples may further be used in combination to achieve a desired functional controller module. Computers, microcontrollers and microprocessors may be programmed using languages such as assembly, C, C++, C #, or the like. FPGAs, ASICs and CPLDs are often programmed using hardware description languages (HDL) such as VHSIC hardware description language (VHDL) or Verilog that configure connections between internal hardware modules with lesser functionality on a programmable device.

The present disclosure has been described below with reference to flowchart illustrations and/or block diagrams of methods, apparatus, systems and computer program products according to embodiments described herein. It will be understood that each block of the flowchart illustrations and/or block diagrams, and combinations of blocks in the flowchart illustrations and/or block diagrams, can be implemented in hardware, or by executed computer program instructions, or a combination thereof.

As will be appreciated by one skilled in the art, the embodiments can be described as a system, method or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a 'circuit,' 'module' or 'system.'

Furthermore, the present disclosure may take the form of a non-transitory computer readable medium storing instructions of a hardware description language (HDL) (such as the VHSIC hardware description language (VHDL) or Verilog) that describe the apparatus or storing a netlist description the apparatus of claim. Such a description may be used, for example, to configure a field programmable gate array (FPGA), or similar configurable hardware, or used as input to a design tool for a custom integrated circuit.

Accordingly, some of the disclosed embodiments are set out in the following:

1. A method for memory protection in a data processing network, the method comprising: receiving, at a home node of the data processing network, a request message from a first requesting node of the data processing network, where the request message comprises an action request for data associated with a first address in a shared memory of the data processing network and one or more access permissions for the first requesting node for the first memory address; determining, by the home node, from the one or more access permissions, if the requested action is permitted by the first requesting node; when the requested action is permitted by the first requesting node, accessing the data associated with the first memory address from a system cache, a local cache of a second requesting node of the data processing network or the shared memory in accordance with a coherency protocol; and when the requested action is not permitted by the first requesting node, sending a response message to the first requesting node without accessing the data associated with the first memory address.

2. The method of claim 1, where the first requesting node is coupled to the home node via a first memory protection unit of the data processing system, the method further comprising: receiving, by the first memory protection unit, the action request from the first requesting node; determining, by the first memory protection unit, the one or more access permissions dependent upon the first memory address; and augmenting, by the first memory protection unit, the action request with the one or more access permissions for the first requesting node.

3. The method of claim 1, where the action request comprises a read request and where the response message to the first requesting node comprises dummy data when the one or more access permissions do not include read permission.

4. The method of claim 1, where the action request comprises a write request for modified data, the method further comprising the home node discarding the modified data when the one or more access permissions do not include write permission.

5. The method of claim 4, further comprising the home node invalidating the modified data at the first requesting node when the one or more access permissions do not include write permission.

6. The method of claim 1, where the action request comprises a read request, and where accessing the data associated with the first memory address comprises: retrieving, by the home node, modified data associated with the first memory address from the second requesting node; when the second requesting node has write permission for the modified data: when the first requesting node does not have write permission for the modified data: writing, by the home node, the modified data to the shared memory at the first memory address to change the modified data to clean data; and sending, by the home node, the clean data to the first requesting node; and when the first requesting node has write permission for the modified data: sending, by the home node, the modified data to the first requesting node; and when the second requesting node does not have write permission for the modified data: retrieving, by the home node, clean data from the shared memory at the first memory address; sending, by the home node, the clean data to the first requesting node; and invalidating the data associated with the first memory address at the second requesting node.

7. The method of claim 1, where the action request comprises a request to invalidate data at the first address for which the first requesting node does not have write permission, and where accessing the data associated with the first memory address comprises: retrieving, by the home node, data associated with the first memory address from the second requesting node; when the retrieved data is in a modified coherence state: writing, by the home node, the retrieved data to the shared memory at the first memory address to change the coherence state of the data associated with the first memory address from 'modified' to 'clean'; and invalidating the data associated with the first memory address at the second requesting node.

8. The method of claim 1, where the second requesting node is coupled to the home node via a second memory protection unit, the method further comprising: sending, by the home node, a snoop message to the second requesting node; sending, by the second requesting node, a snoop response comprising snooped data; augmenting, by the second memory protection unit, the snoop response with one or more access permissions for the second requesting node; receiving, by the home node, the augmented snoop response; dropping, by the home node, the snooped data when the one or more access permissions for the second requesting node indicate that the second requesting node does not have read permission for the snooped data; and dropping, by the home node, the snooped data when the snooped data is modified and one or more access permissions for the second requesting node indicate that the second requesting node does not have write permission for the modified data.

9. The method of claim 8, further comprising: invalidating the snooped data at the second requesting node when the snooped data is dropped by the home node when the coherency protocol allows the second requesting node to retain a copy of the first data.

10. The method of claim 8, further comprising, when the snooped data is dropped by the home node: retrieving, by the home node, clean data from the shared memory at the first memory address; and sending, by the home node, the clean data to the first requesting node.

11. The method of claim 8, further comprising the second memory protection unit: intercepting the snoop message to the second requesting node; coloring a transaction identifier in the snoop message with the one or more access permissions of the second requesting node to provide a colored snoop message; forwarding the colored snoop message to the second requesting node; intercepting the snoop response from the second requesting node; de-coloring the transaction identifier in the snoop response; and forwarding the decolored snoop response, augmented with the one or more access permissions, to the home node.

12. The method of claim 1, where the action request comprises a request to invalidate data associated with the first memory address, and where accessing the data associated with the first memory address comprises: retrieving, by the home node, data in the system cache or the local cache of the second requesting node, where the data is in a 'modified' coherence state; when the first requesting node does not have write permission for the data: writing the data back to the shared memory to change the coherence state of the data from 'modified' to 'clean', in accordance with the coherency protocol; sending the data to the first requesting node; and changing the coherence state of the data in the system cache or in the local cache of the second requesting node to 'invalid'.

13. An apparatus comprising: a plurality of cross-point switches, where a first cross-point switch of the plurality of cross-point switches comprises a first memory protection unit and provides an interface to a first requesting node; a home node; and an interconnect that couples between the plurality of cross-point switches, the home node and a shared memory, where the home node provides a point of coherency for access to the shared memory; where the first memory protection unit intercepts a message directed from the first from requesting node to the home node, augments the intercepted message with one or more access permission of the first requesting node, and forwards the augmented message to the home node; and where home node responds to the augmented message dependent upon the one or more access permissions.

14. The apparatus of claim 13, where the message is associated with a first memory address in the shared memory and where the first memory protection unit is configured to look up the one or more access permissions in an address table of the first memory protection unit dependent upon the first memory address.

15. The apparatus of claim 13, where a second cross-point switch of the plurality of cross-point switches comprises a second memory protection unit and provides an interface to a second requesting node, and where: the home node is configured to send a snoop message to the second requesting node in response to the message from the first requesting node; the second requesting node is configured to send a snoop response, containing snooped data, to the home node responsive to the snoop message; and the second memory protection unit is configured to intercept the snoop response, augment the snoop response with one or more access permissions of the second requesting node and forward the augmented snoop response to the home node; and where home node is further configured to: drop the snooped data when the one or more access permissions for the second requesting node indicate that the second requesting node does not have read permission for the snooped data; and drop the snooped data when the snooped data is modified and the one or more access permissions for the second requesting node indicate that the second requesting node does not have write permission for the modified data.

16. The apparatus of claim 15, where the home node is further configured to retrieve clean data from the shared memory when the snooped data is dropped, and to forward the clean data to the first requesting node.

17. The apparatus of claim 13, where the home node is further configured to send dummy data to the first requesting node when the message from the first requesting node comprises a read request for data associated with a first memory address in the shared memory and the one or more access permissions indicate that the first requesting node does not have read permission for the first memory address.

18. The apparatus of claim 13, where the home node is further configured to invalidate first data at the first requesting node when the message from the first requesting node comprises a write request for the first data and the one or more access permissions indicate that the first requesting node does not have write permission for the first memory address and the write request is of a type that allows the first requesting node to retain a copy of the first data.

19. The apparatus of claim 18, where the home node is further configured to drop the write request when the one or more access permissions indicate that the first requesting node does not have write permission for the first memory address.

20. A non-transitory computer readable medium containing instructions of a hardware description language that describe the apparatus of claim 13.

21. A non-transitory computer readable medium containing a netlist description the apparatus of claim 13.

22. An integrated circuit comprising the apparatus of claim 13.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

The invention claimed is:

1. A method for memory protection in a data processing network, the method comprising:
receiving, at a home node of the data processing network, a request message from a first requesting node of the data processing network, where the request message comprises an action request for data associated with a first address in a shared memory of the data processing network and one or more access permissions for the first requesting node for the first memory address, and where the first requesting node is coupled to the home node via a first memory protection unit;
determining, by the home node, from the one or more access permissions of the request message, if the requested action is permitted for the first requesting node;
when the requested action is permitted for the first requesting node, accessing the data associated with the first memory address from a system cache, a local cache of a second requesting node of the data processing network or the shared memory in accordance with a coherency protocol, where the second requesting node is coupled to the home node via a second memory protection unit;
when the requested action is not permitted by the first requesting node, sending a response message to the first requesting node without accessing the data associated with the first memory address, where accessing the data associated with the first memory address from the local cache of the second requesting node comprises:
- sending, by the home node, a snoop message to the second requesting node;
- sending, by the second requesting node, a snoop response comprising snooped data;
- augmenting, by the second memory protection unit, the snoop response with one or more access permissions for the second requesting node;
- receiving, by the home node, the augmented snoop response;
- dropping, by the home node, the snooped data when the one or more access permissions for the second requesting node indicate that the second requesting node does not have read permission for the snooped data; and
- dropping, by the home node, the snooped data when the snooped data is modified and one or more access permissions for the second requesting node indicate that the second requesting node does not have write permission for the modified data.

2. The method of claim 1, method further comprising:
- receiving, by the first memory protection unit, the action request from the first requesting node;
- determining, by the first memory protection unit, the one or more access permissions dependent upon the first memory address; and
- augmenting, by the first memory protection unit, the action request with the one or more access permissions for the first requesting node.

3. The method of claim 1, where the action request comprises a read request and where the response message to the first requesting node comprises dummy data when the one or more access permissions do not include read permission.

4. The method of claim 1, where the action request comprises a write request for modified data, the method further comprising the home node discarding the modified data when the one or more access permissions do not include write permission.

5. The method of claim 4, further comprising the home node invalidating the modified data at the first requesting node when the one or more access permissions do not include write permission.

6. The method of claim 1, where the action request comprises a read request, and where accessing the data associated with the first memory address comprises:
- retrieving, by the home node, modified data associated with the first memory address from the second requesting node;
- when the second requesting node has write permission for the modified data and the first requesting node does not have write permission for the modified data:
  - writing, by the home node, the modified data to the shared memory at the first memory address to change the modified data to clean data; and
  - sending, by the home node, the clean data to the first requesting node;
- when the second requesting node has write permission for the modified data and the first requesting node has write permission for the modified data:
  - sending, by the home node, the modified data to the first requesting node; and
- when the second requesting node does not have write permission for the modified data:
  - retrieving, by the home node, clean data from the shared memory at the first memory address;
  - sending, by the home node, the clean data to the first requesting node; and
  - invalidating the data associated with the first memory address at the second requesting node.

7. The method of claim 1, where the action request comprises a request to invalidate data at the first address for which the first requesting node does not have write permission, and where accessing the data associated with the first memory address comprises:
- retrieving, by the home node, data associated with the first memory address from the second requesting node;
- when the retrieved data is in a modified coherence state:
  - writing, by the home node, the retrieved data to the shared memory at the first memory address to change the coherence state of the data associated with the first memory address from 'modified' to 'clean'; and
  - invalidating the data associated with the first memory address at the second requesting node.

8. The method of claim 1, further comprising:
- invalidating the snooped data at the second requesting node when the snooped data is dropped by the home node and the coherency protocol allows the second requesting node to retain a copy of the first data.

9. The method of claim 1, further comprising, when the snooped data is dropped by the home node:
- retrieving, by the home node, clean data from the shared memory at the first memory address; and
- sending, by the home node, the clean data to the first requesting node.

10. The method of claim 1, further comprising the second memory protection unit:
- intercepting the snoop message to the second requesting node;
- coloring a transaction identifier in the snoop message with the one or more access permissions of the second requesting node to provide a colored snoop message;
- forwarding the colored snoop message to the second requesting node;
- intercepting the snoop response from the second requesting node;
- de-coloring the transaction identifier in the snoop response; and
- forwarding the decolored snoop response, augmented with the one or more access permissions, to the home node.

11. The method of claim 1, where the action request comprises a request to invalidate data associated with the first memory address, and where accessing the data associated with the first memory address comprises:
- retrieving, by the home node, data in the system cache or the local cache of the second requesting node, where the data is in a 'modified' coherence state;
- when the first requesting node does not have write permission for the data:
  - writing the data back to the shared memory to change the coherence state of the data from 'modified' to 'clean', in accordance with the coherency protocol;
  - sending the data to the first requesting node; and
  - changing the coherence state of the data in the system cache or in the local cache of the second requesting node to 'invalid'.

12. An apparatus comprising:
- a plurality of cross-point switches, where a first cross-point switch of the plurality of cross-point switches comprises a first memory protection unit and provides an interface to a first requesting node and a second cross-point switch of the plurality of cross-point switches comprises a second memory protection unit and provides an interface to a second requesting node;

a home node; and an interconnect that couples between the plurality of cross-point switches, the home node and a shared memory, where the home node provides a point of coherency for access to the shared memory;

where the apparatus is configured to perform a method comprising:

- the first memory protection unit intercepting a message directed from the first from requesting node to the home node, augmenting the intercepted message with one or more access permission of the first requesting node, and forwarding the augmented message to the home node;
- the home node responding to the augmented message dependent upon the one or more access permissions;
- the home node sending a snoop message to the second requesting node in response to the augmented message;
- the second requesting node sending a snoop response, containing snooped data, to the home node responsive to the snoop message;
- the second memory protection unit intercepting the snoop response, augmenting the snoop response with one or more access permissions of the second requesting node and forwarding the augmented snoop response to the home node; and
- the home node dropping the snooped data when the one or more access permissions for the second requesting node indicate that the second requesting node does not have read permission for the snooped data; and
- the home node dropping the snooped data when the snooped data is modified and the one or more access permissions for the second requesting node indicate that the second requesting node does not have write permission for the modified data.

13. The apparatus of claim 12, where the message is associated with a first memory address in the shared memory and where the first memory protection unit is configured to look up the one or more access permissions in an address table of the first memory protection unit dependent upon the first memory address.

14. The apparatus of claim 12, where the home node is further configured to retrieve clean data from the shared memory when the snooped data is dropped, and to forward the clean data to the first requesting node.

15. The apparatus of claim 12, where the home node is further configured to send dummy data to the first requesting node when the message from the first requesting node comprises a read request for data associated with a first memory address in the shared memory and the one or more access permissions indicate that the first requesting node does not have read permission for the first memory address.

16. The apparatus of claim 12, where the home node is further configured to invalidate first data at the first requesting node when the message from the first requesting node comprises a write request for the first data and the one or more access permissions indicate that the first requesting node does not have write permission for the first memory address and the write request is of a type that allows the first requesting node to retain a copy of the first data.

17. The apparatus of claim 16, where the home node is further configured to drop the write request when the one or more access permissions indicate that the first requesting node does not have write permission for the first memory address.

18. A non-transitory computer readable medium containing instructions of a hardware description language that describe the apparatus of claim 12.

19. A non-transitory computer readable medium containing a netlist description the apparatus of claim 12.

20. An integrated circuit comprising the apparatus of claim 12.

* * * * *